United States Patent [19]
Murugan et al.

[11] Patent Number: 5,387,859
[45] Date of Patent: Feb. 7, 1995

[54] STEPPED WAVEFORM VSCF SYSTEM WITH ENGINE START CAPABILITY

[75] Inventors: Muthu K. Murugan, Howell; Robert C. Eckenfelder, Point Pleasant; James Widdis, Oceanport, all of N.J.

[73] Assignee: AlliedSignal Inc., Morristownship, Morris County, N.J.

[21] Appl. No.: 36,793

[22] Filed: Mar. 25, 1993

[51] Int. Cl.6 .................. H02P 9/04; H02M 5/458
[52] U.S. Cl. ........................... 322/10; 290/46; 363/37
[58] Field of Search ............................. 322/10

[56] References Cited

U.S. PATENT DOCUMENTS

| | | | |
|---|---|---|---|
| 3,746,963 | 7/1973 | Venard, II | 321/2 |
| 3,937,974 | 2/1976 | Lafuze | 290/46 |
| 4,119,861 | 10/1978 | Gocho | 322/32 X |
| 4,743,777 | 5/1988 | Shilling et al. | 322/29 X |
| 4,841,216 | 6/1989 | Okada et al. | 322/10 |
| 4,862,341 | 8/1989 | Cook | 322/10 X |
| 4,968,926 | 11/1990 | Dhyanchand | 322/10 |
| 4,992,721 | 2/1991 | Latos | 322/10 |
| 5,012,177 | 4/1991 | Dhyanchand et al. | 322/10 |
| 5,036,267 | 7/1991 | Markunas et al. | 322/10 |
| 5,055,764 | 10/1991 | Rozman et al. | 322/10 |
| 5,068,590 | 11/1991 | Glennon et al. | 322/10 |

*Primary Examiner*—R. J. Hickey
*Attorney, Agent, or Firm*—Donald B. Paschburg; Howard G. Massung

[57] ABSTRACT

A power converter that can be used either as a start converter or as a variabe speed constant frequency converter is utilized within a stepped waveform VSCF system having engine start capability. Interfacing with the converter are a load bus, a contactor, a field excitation controller and a starter/generator having a main generator, an exciter generator and a permanent magnet generator. Magnetic components and semiconductor components perform multi-functions and minimal degradation of input power quality occurs.

11 Claims, 4 Drawing Sheets

STEPPED WAVEFORM VSCF SYSTEM WITH ENGINE START CAPABILITY

BACKGROUND OF THE INVENTION

1. Field of the Invention

The present invention relates to a power converter and, more particularly, to a stepped waveform VSCF converter which can be used either as an electrical power source that accepts variable frequency, variable voltage, AC power and provides constant voltage, constant frequency, AC power or as a start converter that starts main or auxiliary engines from an AC source with minimal disturbance to the input power quality.

2. Description of the Prior Art

There are a wide variety of VSCF power converters that provide a constant frequency, constant voltage, from a variable frequency, variable voltage, obtained from an AC synchronous generator mounted on the prime mover (main or auxiliary engine). However, very few VSCF converters have start capability to start the AC synchronous generator and, in turn, the prime mover. If a VSCF converter has this capability, it has been found to either pollute the input source and degrade input power quality or an extensive reconfiguration of the power converter, with power contactors between generate and start operation mode, has been required. This is described in U.S. Pat. No. 4,968,926 issued to Dhyan Chand. The use of such converters increases weight and decreases reliability.

It is an object of the present invention to incorporate, with minimal modification, generate and start features into a 24-stepped waveform VSCF converter. The present invention will provide improved power quality therefore taking advantage of common components such as transformers and semiconductors.

SUMMARY OF THE INVENTION

The present invention provides a converter that performs dual functions. It can be used either as a start converter, or as a VSCF converter. As a start converter, it is capable of starting a brushless AC synchronous generator as a brushless DC motor and, in turn, starting the main or auxiliary engine from a three-phase input with minimal disturbance to input power source. As a VSCF converter, the present invention can convert the variable frequency, variable voltage, obtained from an AC synchronous generator into a regulated constant frequency AC output voltage.

Besides the converter, the entire system comprises a load bus, a contactor, a field excitation controller and a starter/generator having a main generator, an exciter generator and a permanent magnet generator. The starter/generator is mounted on the aircraft engine. Within the disclosed converter, magnetic components (transformer, filter inductors) and semiconductor components (transistors and the associated flywheel diodes) perform multi-functions. This multi-functionality serves to minimize the total component count allowing the converter to be both compact and lightweight; two critical attributes for aerospace applications.

DETAILED DESCRIPTION OF THE INVENTION

Figure 1:
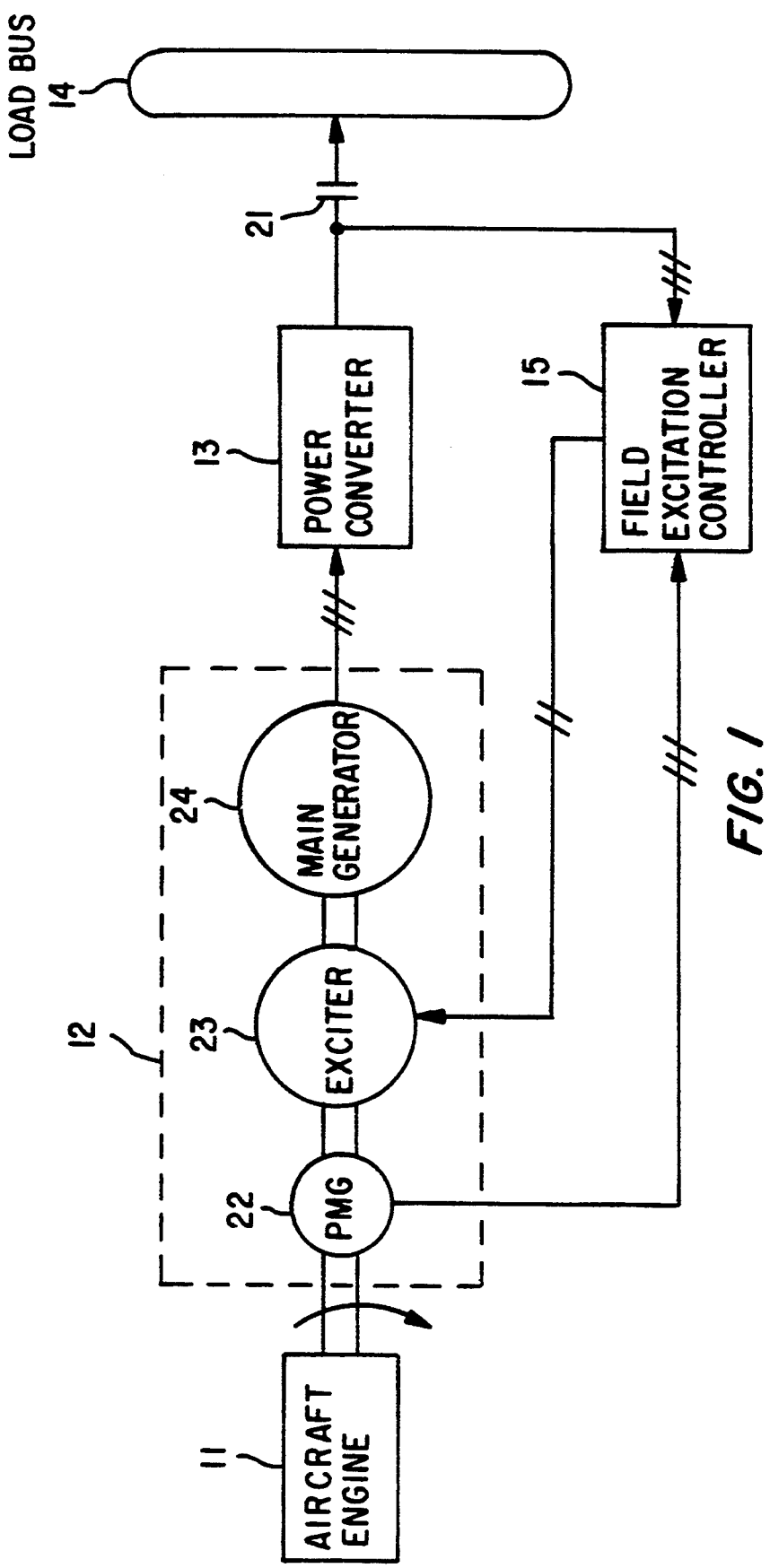
FIG. 1 is a block diagram of a preferred embodiment of the present invention during operation in generating mode.

As shown in FIG. 1, the power converter 13 operates as a VSCF (Variable Speed Constant Frequency) converter during operation in the generating mode. The starter/generator 12 mounted on the aircraft engine 11 (main or auxiliary) generates variable frequency, variable voltage, depending upon engine speed. The output of starter/generator 12 enters the power converter 13. The power converter 13 operates as a VSCF converter and converts the starter/generator 12 output into regulated three-phase four wire constant frequency AC power. This regulated AC power is delivered to the load bus 14 through contactor 21.

The starter/generator 12 consists of three generators within its housing. They are permanent magnet generator (PMG) 22, exciter generator 23 and main generator 24. The PMG 22 provides power to the field excitation controller 15. The field excitation controller 15 regulates the output of the power converter 13 by monitoring the output of the power converter 13 and by adjusting the DC excitation of the excitor field (not shown)of the starter/generator 12. The exciter armature (rotor) (not shown) voltage is rectified by the rotating diodes in the starter/generator 12 and applied as main rotor field excitation.

Figure 2:
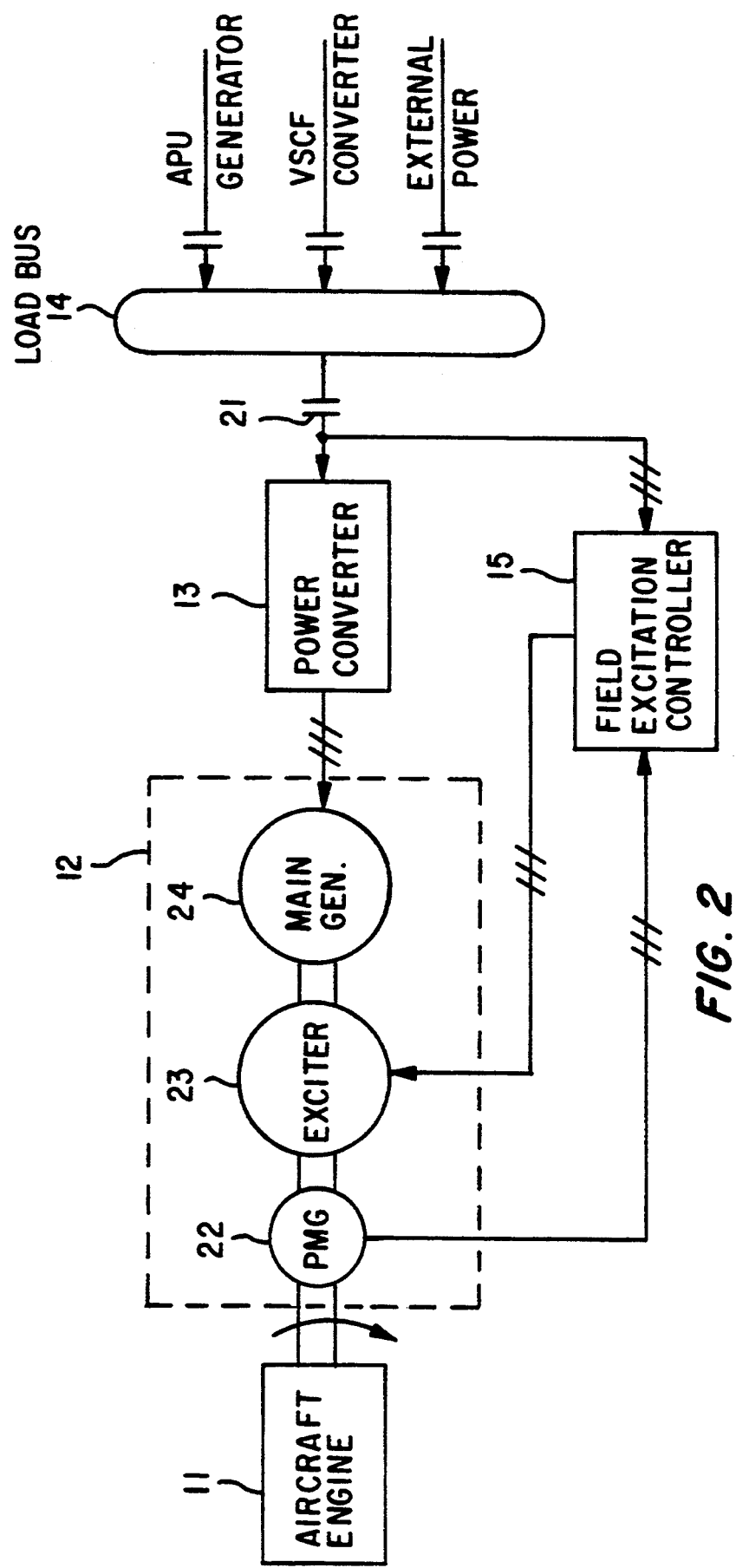
FIG. 2 is a block diagram of a preferred embodiment of the present invention during operation in starting mode.

As shown in FIG. 2, the power converter 13 operates as a start converter during operation in the starting mode. The power converter 13 receives its input power from the load bus 14 through contactor 21. The load bus 14 can be supplied either from external power, an APU generator or another VSCF converter. The output of the power converter 13 is applied to the stator (not shown) of the main generator 24 of starter/generator 12. Starter/generator 12 also comprises permanent magnet generator 22 and exciter generator 23. The output of the power converter 13 that is supplied to the starter/generator 12 is a variable frequency, variable voltage. The field excitation controller 15 provides three-phase AC excitation to the exciter field which, in turn, is coupled to the main generator rotor field (not shown) by transformer action. The output of the power converter 13 and rotor field excitation from field excitation controller 15 provides starting power during starting mode to start the aircraft engine 11 and bring it to the rated speed. Generate function is initiated as soon as start function is accomplished.

Figure 3:
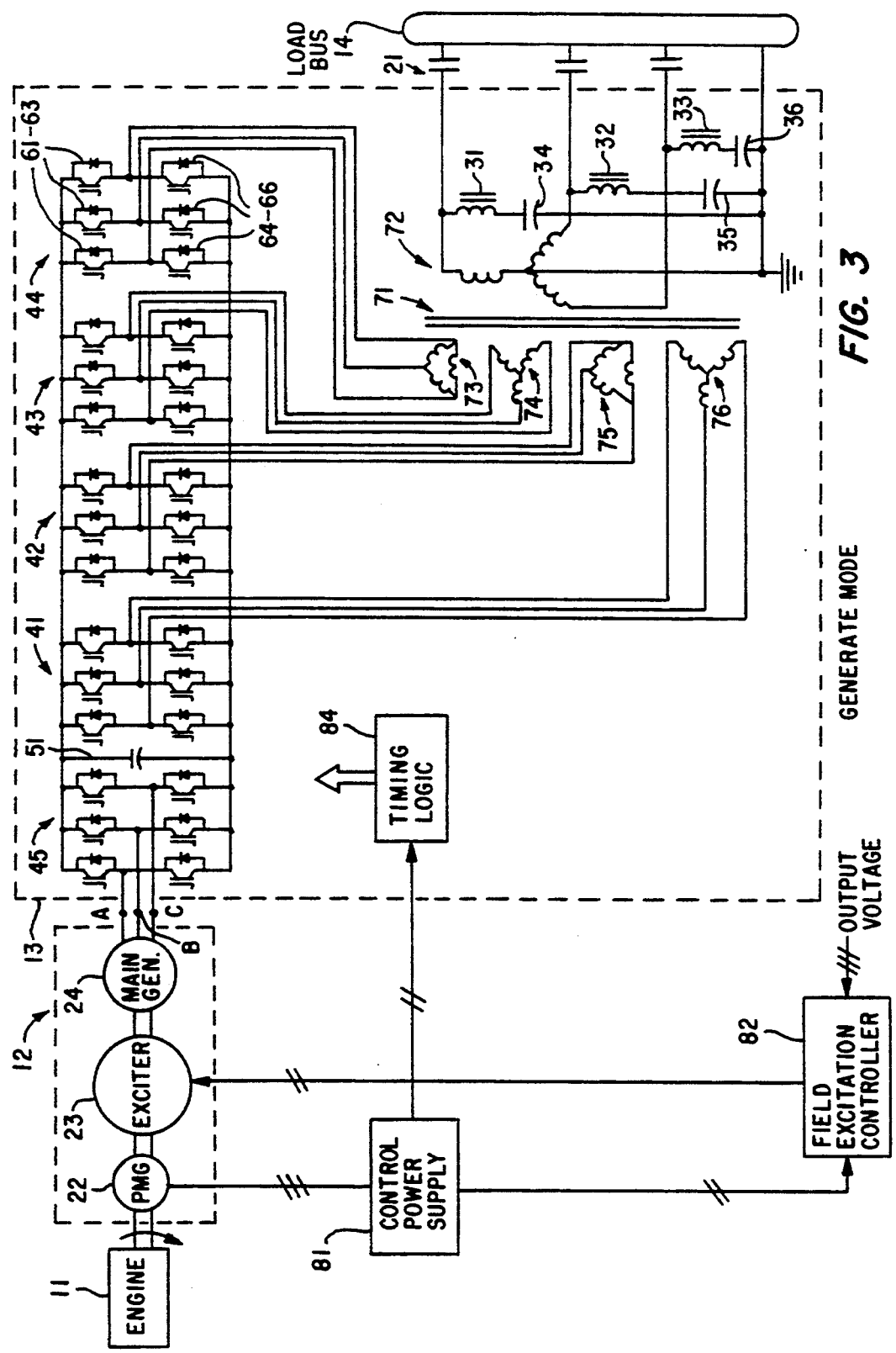
FIG. 3 is a schematic diagram illustrating a circuit equivalent to the preferred embodiment of the present invention during operation in generation mode.

As stated earlier, the invention performs dual functions and FIG. 3 illustrates the present invention utilized for variable speed constant frequency, VSCF Conversion. This embodiment of the invention consists of power converter 13 that is comprised of three major subcircuits: Five DC/AC, three-phase inverters 41–45, three-phase transformer 71 with multiple primary windings and high frequency trap-tuned filters 31–36. The inverters 41–45 share a common DC bus. The filter capacitor 51 attenuates the voltage ripple that is present in the common DC bus. Each inverter consists of six semiconductor switches 61-66 (bipolar or IGBT or FET or MCT) having associated flywheel rectifiers or diodes. The inverters 41-44 are identical in rating and each of them process one-fourth of the total power.

During generate mode, the power converter 13 receives its input at inverter 45 terminal A-B-C from the main generator 24 of starter/generator 12. It is variable frequency, variable voltage, AC power. The semiconductor switches 61-66 of the inverter 45 are biased OFF. The diodes connected across the semiconductor switches 61-66 of the inverter 45 rectify the AC power that is available at the terminal A-B-C and supply DC voltage to the DC bus. The filter capacitor 51 attenuates the voltage ripple in the DC bus voltage. The DC bus voltage is connected to the inverters 41-44. The phase outputs of the inverters 41 and 43 are connected to the wye connected primary windings 76 and 74 respectively of summing transformer 71 which provides isolation. The phase outputs of the inverters 42 and 44 are connected to the delta connected primary windings 75 and 73 respectively of the summing transformer 71. The secondary windings of the summing transformer 71 is a wye connected, four wire system and is connected to the load bus through contactor 21.

The semiconductor switches of the inverters 41-44 are switched ON and OFF at the desired output frequency, in a pre-programmed manner, by the timing logic 84 to produce a twenty-four step three-phase AC output voltage at the wye connected secondary winding 72 of the summing transformer 71. The trap filters connected across each phase to neutral are designed to attenuate the 23rd and 25th harmonics that are present at the output of the transformer secondary. The output of the summing transformer 71 is connected to the load bus 14 through contactor 21. The field excitation controller 82 regulates the output of the power converter 13 by monitoring the output and adjusting the DC excitation of the excitor field (not shown) of exciter generator 23 of starter/generator 12 and, in turn, the starter/generator 12 output voltage. Exciter generator field windings are connected in series in generate mode. The control power supply 81 derives its input power from PMG 22 of starter/generator 12 which is connected to engine 11 and provides conditioned power to timing logic 84 and field excitation controller 82.

Figure 4:
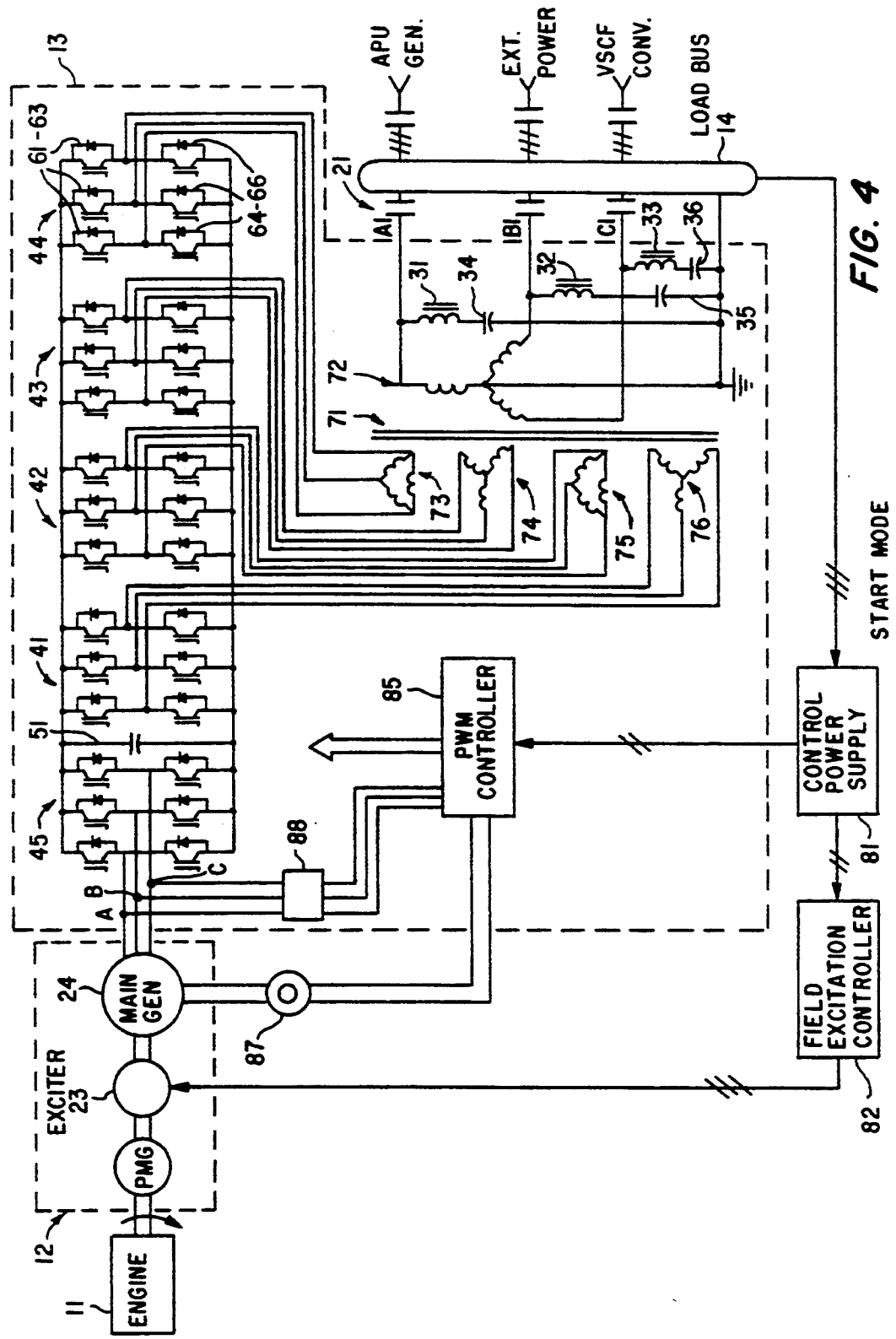
FIG. 4 is a schematic diagram illustrating a circuit equivalent to the preferred embodiment of the present invention during the starting of an AC synchronous generator as a brushless DC motor.

As is shown in FIG. 4, the present invention may be utilized for starting an aircraft engine 11 by starting an AC generator mounted on the engine as a brushless DC motor. In start mode the power converter 13 receives its power from the three-phase AC input power from the load bus through contactor 21 at the terminals A1-B1-C1 of the wye connected secondary winding 72 of the transformer 71. Transformer 71, which provides isolation, contains high frequency trap-tuned filters 31-36. The wye connected primary windings 74 and 76 are connected to the phase outputs of the inverters 41 and 43, respectively. The delta connected primary windings 75 and 73 are connected to the phase outputs of the inverters 42 and 44, respectively. In the start mode of operation, the semiconductor switches 61-66 associated with inverters 41-44 are biased OFF.

The AC voltage induced in the primary windings 73, 74, 75 and 76 of transformer 71, due to applications of three-phase AC power to the wye connected secondary winding 72, are rectified by the flyback diodes of inverters 41-44. The rectified DC voltage is connected to the DC terminals of the inverter 45. The filter capacitor 51 attenuates the voltage ripple in the rectified DC voltage that is supplied to the inverter 45. The DC voltage is converted to variable voltage, variable frequency, AC voltage by the inverter 45 and applied to the stator terminals of the main generator 24 of starter/generator 12.

The semiconductor switches of inverter 45 are controlled by the PWM controller 85. The inverter drive signals from the PWM controller 85 are locked to the rotor position information obtained either directly from the resolver 87 or indirectly from the back EMF sensor circuit 88. This feature ensures that the generator 12 starts as a brushless DC motor and never pulls out of synchronism. The control power supply 81 derives its power from the load bus 14 and provides power to the PWM controller 85 and field excitation controller 82.

When the starter/generator 12 is stationary, sufficient DC excitation is provided to the main rotor field (not shown) by injecting three-phase square wave AC voltage from the field excitation controller 82 to the three-phase exciter field (not shown) of exciter generator 23 of starter/generator 12. By transformer action voltages are induced in the exciter generator 23 rotor windings (not shown). The induced voltages are rectified by the rotating diodes (not shown) and the rectified DC voltage is supplied to the main rotor field (not shown) of the starter/generator 12.

The PWM controller 85 controls the output amplitude and frequency of the inverter 45 and, in turn, the speed of the starter/generator 12. As soon as the starter/generator 12 reaches its rated speed, the generate function (VSCF operation) is initiated. The inverter drive signals provided by the PWM controller 85 are locked to the rotor position information obtained either from the resolver 87 or from the back EMF sensor circuit 88.

As there is a phase shift of thirty degrees between wye connected secondary winding 72 and primary delta windings 73 and 75 of transformer 71, the input current waveform comprises twelve steps. The lowest current harmonics are eleventh and thirteenth. The filters required to filter these harmonics are very small in size and weight.

During start operation, the switching loss dominates in the inverter 45. The semiconducter switches of inverter 45 are compatible for high frequency operation and are able to process the start power required.

In other embodiments of the invention, semiconductor switches of the inverters are switched ON and OFF at a desired output frequency, in a pre-programmed manner, by the timing logic to produce a twelve-step or any multiple of twelve such as twenty-four, thirty-six, etc. . . step three phase AC output voltage at the wye connected secondary winding of the summing transformer. As the number of steps increases above twenty-four, there is no need for the trap tuned filters. Also, if there is only a twelve step three-phase AC output voltage, only a total of three inverters are required. For a thirty-six step three-phase AC output, a total of seven inverters are required.

It is not intended that this invention be limited to the hardware arrangement, or operational procedures shown disclosed. This invention includes all of the alterations and variations thereto as encompassed within the scope of the claims as follows.

We claim:

1. A stepped waveform VSCF system with engine start capability comprising:

starter/generator means mounted to an engine;

converter means connected to said starter/generator means and including a plurality of DC/AC inverters connected to said starter/generator means, a plurality of high frequency trap-tuned filters connected to contactor means, three phase transformer means connected between said plurality of high frequency trap-tuned filters and said plurality of DC/AC inverters for providing isolation, and filter capacitor means connected across said plurality of DC/AC inverters;

field excitation controller means connected to said starter/generator means;

control power supply means connected to said field excitation controller means;

said contactor means connected to said converter means;

load bus means connected to said contactor means;

said three phase transformer means including secondary winding means connected to said plurality of high frequency trap-tuned filters and primary winding means connected to said plurality of DC/AC inverters;

said converter means including timing logic means for switching on and off at a desired frequency, each of a plurality of semiconductor switches to produce a multiple step three-phase output voltage at said secondary winding means of said three phase transformer means;

said converter means further including PWM controller means connected to said control power supply means;

resolver means connected between said starter/generator means and said PWM controller means; and back EMF sensor circuit means connected to said PWM controller means.

2. A stepped waveform VSCF system with engine start capability as claimed in claim 1 wherein said starter/generator means comprises:

permanent magnet generator means connected to said engine;

exciter generator means connected to said permanent magnet generator means and to said field excitation controller means; and, main generator means connected to said exciter generator means and to said converter means.

3. A stepped waveform VSCF system with engine start capability as claimed in claim 2 wherein said permanent magnet generator means provides power to said field excitation controller means which influences excitation of exciter of said exciter generator means within said starter/generator means.

4. A stepped waveform VSCF system with engine start capability as claimed in claim 1 wherein each of said plurality of DC/AC inverters comprises:

a plurality of semiconductor switches having associated flywheel rectifiers or diodes.

5. A stepped waveform VSCF system with engine start capability as claimed in claim 1 wherein said converter means can be used as a start converter.

6. A stepped waveform VSCF system with engine start capability as claimed in claim 1 wherein said converter means can be used as a variable speed constant frequency converter.

7. A stepped waveform VSCF system with engine start capability as claimed in claim 1 wherein said converter means can be used as a start converter and as a variable speed constant frequency converter causing minimal degradation of input power quality.

8. A stepped waveform VSCF system with engine start capability as claimed in claim 1 wherein said converter means comprises:

five DC/AC three-phase inverters connected to said starter/generator means;

three high frequency trap-tuned filters connected to said contactor means;

three phase transformer means connected between said three high frequency trap-tuned filters and said five DC/AC converters for providing isolation; and, filter capacitor means connected across said five DC/AC converters.

9. A stepped waveform VSCF system with engine start capability as claimed in claim 8 wherein each of said five DC/AC inverters comprises:

six semiconductor switches having associated flywheel rectifiers or diodes.

10. A stepped waveform VSCF system with engine start capability as claimed in claim 9 wherein said three phase transformer means comprises:

said secondary winding means connected to said three high frequency trap-tuned filters; and, said primary winding means connected to four of said five DC/AC inverters.

11. A stepped waveform VSCF system with engine start capability as claimed in claim 10 wherein said converter means further comprises:

said timing logic means for switching on and off at the desired frequency, each of said six semiconductor switches to produce a twenty-four step three-phase AC output voltage at said secondary winding means of said three-phase transformer means.

* * * * *